J. RUGGLES.
Apparatus for Making Vinegar.
No. 6,072.  Patented Jan'y 30, 1849.
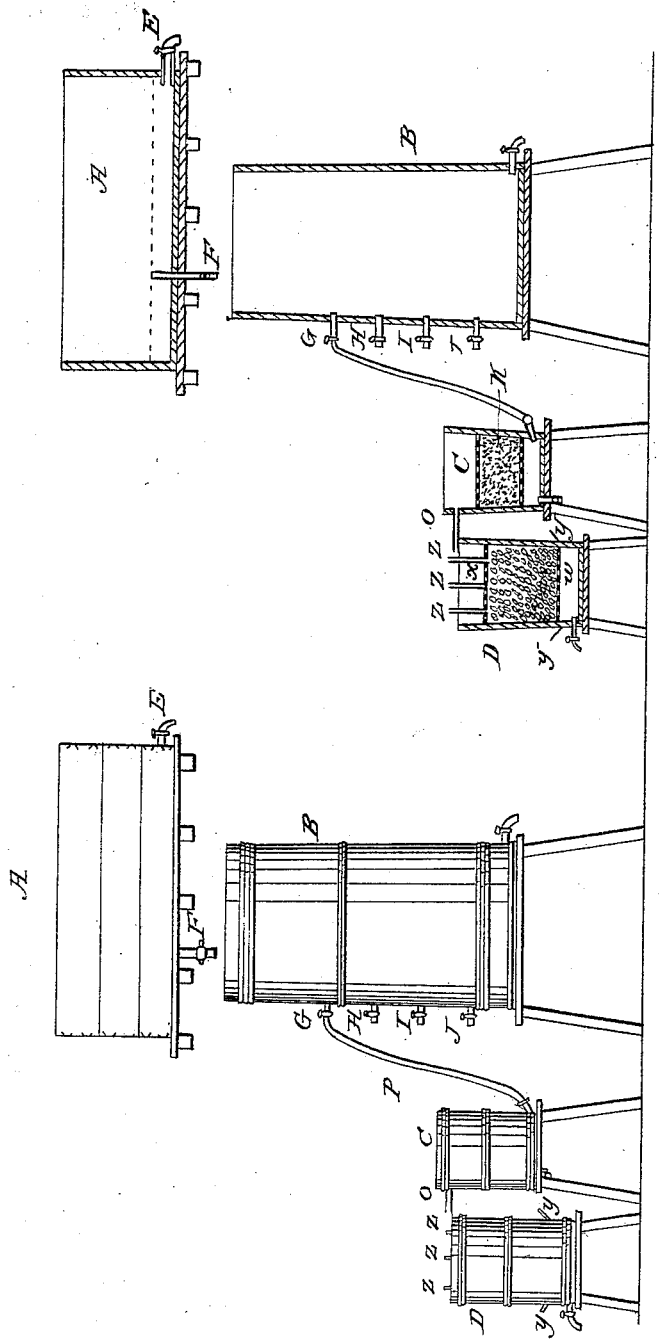

UNITED STATES PATENT OFFICE.

JAMES RUGGLES, OF PHILADELPHIA, PENNSYLVANIA.

MANUFACTURE OF VINEGAR.

Specification of Letters Patent No. 6,072, dated January 30, 1849.

*To all whom it may concern:*

Be it known that I, JAMES RUGGLES, of the city and county of Philadelphia and State of Pennsylvania, have invented a new and useful Improvement in the Process of Manufacturing Vinegar; and I do hereby declare that the following is a full, clear, and exact description thereof.

The principle of my invention is a discovery which I have made, viz., that the swill or slops of whisky distilleries and of other manufactories employing similar materials, contain a large amount of the elements of vinegar, such slops or swills likewise contain a considerable quantity of other ingredients, not capable of forming vinegar from which it is necessary to free them before completing the chemical process of transforming them into vinegar. Without such purification the proper rapidity of action could not be attained, and a process of putrefaction would ensue both offensive and deleterious.

The nature of my invention consists in the application of means for economizing a substance now generally thrown away as useless. These means are first the partial fermentation or acetification of the slops; second the clarification of them by allowing all the heavier parts of solid matter to subside, and the clear liquid to be drawn off from different elevations. Thirdly the passing of the partly clarified liquid through suitable filters to separate the lighter floating particles, and render the liquid transparent and, fourthly the oxygenation of the clarified swill by passing it through a percolating apparatus composed of woody fragments or shavings among which atmospheric air has a free admittance.

The manner in which I carry into effect my said discovery and invention and convert the swill or slops into vinegar, is represented in the accompanying drawings, in which A is a large, not very deep vat, in which the swill is exposed for a time sufficient to allow the heavier particles of matter to subside, and the acetifying process to be commenced.

F, is a stop-cock with a pipe ascending some distance within the vat A, by which the partly purified liquor is allowed to flow into the deep clarifying cistern B. The remaining lees or residuum in A may, when necessary, be drawn off through the cock E, situated at the bottom. In B the liquid is again allowed to remain a sufficient time to settle and undergo a further clarification. As the upper part of the liquor first becomes clear, the upper one of a series of stop-cocks or equivalent apparatus G, H, I, J, is opened after being connected with a proper conduit pipe P, allowing the liquor to flow into and through the filtering tub C, containing the filtering material K, and then to flow off through the spout O into the percolating apparatus D, which is a tub with a false bottom $w$ and a strainer $x$ between which the space is filled with wood shavings, chips and fragments of timber, loosely laid in, after having been boiled in water and impregnated with vinegar, and affording spaces for the free passage of air among the woody material. For this latter purpose the air passages $y, y$, are intended and also the tubes through the strainer, $z, z, z$. The vessel D is kept at a moderate degree of warmth, varying from 75 to 80 degrees of Fahrenheit. On escaping from this vessel the liquor is found to be converted into good vinegar.

In using the filtering apparatus C it will occasionally be found necessary to clear the impurities therefrom, which I effect by pouring in a copious supply of pure water and allowing it to flow through in a direction opposite to that in which the filtered liquid had passed.

In case the slop or swill has been too much weakened with water, I add to the liquid small proportions of sugar, gum, starch, poor spirit, waste raisins, or other suitable nonnitrogenized materials by means of which the strength of the vinegar is increased. The addition of any of these materials, when necessary, may be made during the exposure of the liquid to clarification in the large cistern B. During the slow acetous fermentation which takes place in the vessel A, great advantage is derived from maintaining the temperature between 70 and 110 degrees Fahrenheit, for which reason, as well as for convenience in drawing off, I place it in the highest part of a warm apartment.

The discovery which I have made, that good and wholesome vinegar can be easily and economically made from the waste or spent liquors of distilleries, breweries, stout, and other factories, and the invention which I have predicated thereon, are intended to render profitable and salutary, a class of substances which have hitherto been either thrown away as useless, and allowed to become nuisances, or given to cattle, swine, &c., with no small detriment as I verily believe, to the health, both of the animals so fed, and of the persons who subsist on their flesh or their milk.

What I claim as my invention and desire to secure by Letters Patent is—

1. The making of good wholesome vinegar from the slops or swill, commonly so called, being the waste or spent liquors of distilleries and other manufactories, in the manner and by means of the several processes, substantially as herein set forth.

2. I also claim the making of vinegar from the combination of slops or swills, waste or spent liquors of distilleries, breweries, starch manufactories, and other work shops in which vegetable substances have undergone fermentation and partial decomposition, with vinous, or alcoholic, amylaceous, saccharine or other vegetable materials added thereto, when employed to increase the strength of vinegar manufactured from said slops or swills, waste or spent liquors, in the manner herein set forth.

3. I also claim the above described combination of apparatus for effecting the several successive processes of converting the slops or swills of distilleries and other manufactories and the mixtures of the same with other materials added thereto to increase the strength of the vinegar, not confining myself to the precise arrangement herein described, or to any specified number of vessels in which to perform each process, but varying the same as circumstances shall require while I attain the objects herein set forth by means substantially the same.

JAMES RUGGLES.

Witnesses:
 WALTER R. JOHNSON,
 A. STEINWEHR.